UNITED STATES PATENT OFFICE.

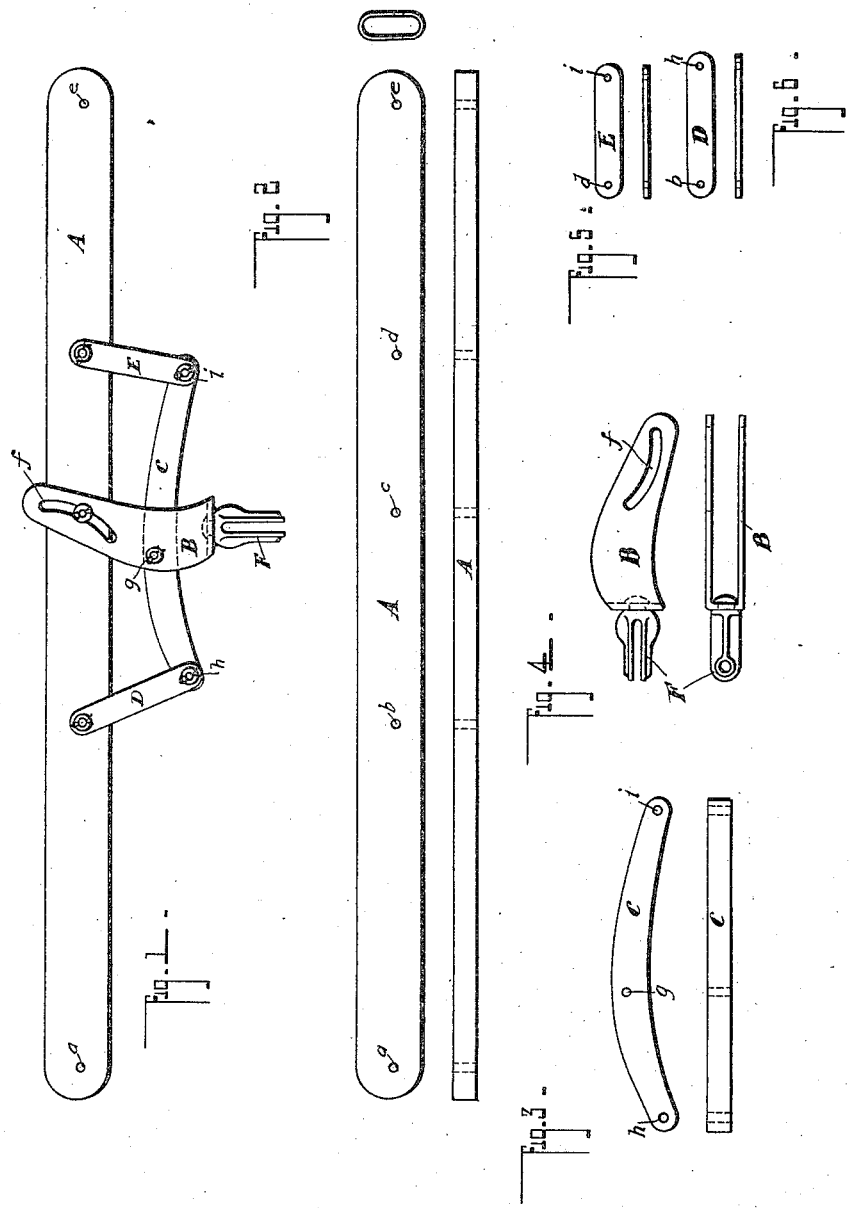

KARL APPENHEIMER, OF MARKINCH, SASKATCHEWAN, CANADA.

FOUR-HORSE EVENER.

1,182,129.  Specification of Letters Patent.  Patented May 9, 1916.

Application filed August 13, 1913. Serial No. 784,559.

*To all whom it may concern:*

Be it known that I, KARL APPENHEIMER, of the village of Markinch, in the Province of Saskatchewan, Canada, have invented certain new and useful Improvements in Four-Horse Eveners, of which the following is the specification.

The invention relates to four horse eveners especially adapted for use with plows and other such like farm machines, and the object of the invention is to provide a four horse evener which will provide an even pull and prevent any of the draft animals from walking on the plowed land in instances where the evener is used with a plow.

A further object of the invention is to provide an evener which will prevent seesawing and sudden side strain when employed.

With the above objects in view the invention consists essentially in the arrangement and constructions of parts hereinafter more particularly described and later pointed out in the appended claim.

Figure 1 represents a plan view of the evener assembled. Fig. 2 is a plan, side and end view of the main draw beam. Fig. 3 is a plan and side view of the short evener bar. Fig. 4 is a plan and side view of the clevis. Figs. 5 and 6 are plan and side views of the side braces.

In the drawing like characters of reference indicate corresponding parts in each figure.

A represents a main draft beam which has in the present instance five holes drilled therein as indicated at $a$, $b$, $c$, $d$ and $e$, these holes being located at certain distances from each other to give the proper balancing effect as later explained. The usual doubletrees (not shown) are attached by means of suitable bolts (not shown) to the ends of the draft beam, these bolts passing through the openings $a$ and $e$.

D and E are side braces provided with openings $b$ $h$ and $d$ $i$ at their ends. These braces are fastened pivotally to the draft beam by bolts or spread keys, said bolts passing through the openings $d$ $b$ appearing both in the brace bars and the draft beam.

C is an evener bar having end openings $h$ $i$ corresponding to those $h$ $i$ located in ends of the braces D and E. This bar is also provided with an opening $g$. This bar is bent as shown and has the ends thereof pivotally fastened to the braces D and E by bolts or spread keys passing through the openings $h$ and $i$ supplied in the bar and the braces.

B is a clevis having the opposing jaws thereof fitted with curved slots $f$ and also openings $g$ which latter openings correspond with the opening $g$ in the bar C. The jaws of the clevis are arranged to span both the bar C and the draft beam A. The clevis is fastened to the bar by a bolt passing through the openings $g$ supplied in said bar and also in the jaws of the clevis. This bolt is necessarily heavier than the other bolts as it takes a greater proportion of the strain of the draft. A further bolt is passed through the opening $c$ in the draft beam, which bolt extends into and through the slots $f$ in the clevis.

In actual practice when the draft animals are attached by means of the double trees to the ends of the draft beam it will be seen that the team hitched to the left hand or longer end of the beam A draw through the links D and short end of the evener bar C, while the team hitched to the right hand or short end of the bar A draw through the links E on the long end of the evener bar C. The draft is accordingly equalized through the evener bar and transmitted through the clevis to the attached plow.

It is remarked that the arrangement allows three of the draft animals to walk on the landside and one in the furrow while evenly distributing the draft through the equalizer. The slots $f$ are curved to allow the clevis to work back and forth smoothly on the bolt passing through the opening $o$.

What I claim as my invention is:—

The combination comprising, a draft beam, an evener bar located to the rear of the draft beam and to the side of the center thereof, forwardly directed side braces having their rear ends pivotally secured to the ends of the evener bar and their forward ends pivotally secured to the beam, a clevis having a pair of forwardly directed jaws spanning the evener bar and the beam and provided, in the jaws, with curved slots crossing the beam and disposed at an angle to the line of draft, a bolt passing through the beam and having the ends thereof slidably received within the slots, a bolt connecting the evener bar pivotally to the clevis and a hitching swivel located at the rear end of the clevis.

Signed at Winnipeg this 9th day of August 1913.

KARL APPENHEIMER.

In the presence of—
G. S. ROXBURGH,
J. M. LEPLEY.

Copies of this patent may be obtained for five cents each, by addressing the "Commissioner of Patents, Washington, D. C."